United States Patent [19]

Ciepichal

[11] Patent Number: 4,865,170
[45] Date of Patent: Sep. 12, 1989

[54] METHOD AND APPARATUS FOR SEALING
[75] Inventor: Thomas P. Ciepichal, Toledo, Ohio
[73] Assignee: Monroe Auto Equipment Company, Monroe, Mich.
[21] Appl. No.: 125,237
[22] Filed: Nov. 25, 1987
[51] Int. Cl.[4] .............................................. F16F 9/36
[52] U.S. Cl. .................................. 188/322.17; 92/168; 188/264 B; 188/315; 277/202; 277/208; 277/215; 277/70
[58] Field of Search ............... 188/322.17, 264 B, 315; 277/208, 202 R, 209, 212 C, 215, 70, 201, 202; 92/153, 168

[56] References Cited
U.S. PATENT DOCUMENTS

| 1,313,202 | 8/1919 | Mustor | 277/208 X |
| 2,778,695 | 1/1957 | Sturtevant | 277/208 X |
| 3,822,068 | 7/1974 | Litherland | 277/208 |
| 4,005,769 | 2/1977 | Itoh | 188/377.17 X |
| 4,086,844 | 5/1978 | Homuth | 92/168 X |
| 4,185,721 | 1/1980 | Karklins et al. | 92/168 X |
| 4,695,061 | 9/1987 | Meisner et al. | 277/152 X |

FOREIGN PATENT DOCUMENTS
609018 11/1960 Canada ......................... 188/322.17

Primary Examiner—George E. A. Halvosa
Attorney, Agent, or Firm—Harness, Dickey, Pierce

[57] ABSTRACT

A seal is provided for a shock absorber having a housing and a piston rod partially disposed within the damping fluid in the working chamber of the shock absorber. The seal comprises a first surface engaging the housing operable to prevent the flow of damping fluid between the first surface and the housing. The seal further comprises a second surface engaging the piston rod, the second surface operable to prevent the flow of damping fluid between the second surface and the piston rod. The second surface of the seal comprises a first annular recess coaxially disposed on the second surface with respect to the piston rod, as well as a first annular lip coaxially disposed on the second surface. Finally, the second surface comprises a groove which reduces friction between the piston rod and the seal.

11 Claims, 4 Drawing Sheets

METHOD AND APPARATUS FOR SEALING

BACKGROUND OF THE INVENTION

1. Field of the Invention

This invention relates to seals which are used with movable members such as piston rods in shock absorbers, and more particularly to a method and apparatus for sealing a movable member with respect to a fixed member.

2. Description of Related Art

Shock absorbers are used in connection with automotive suspension systems to absorb unwanted vibrations which occur during driving. To absorb unwanted vibrations, shock absorbers are generally connected between the body and the suspension of the automobile. A piston is located within the shock absorber and is connected to the body of the automobile through a piston rod. Because the piston is able to limit the flow of damping fluid within the working chamber of the shock absorber when the shock absorber is compressed, the shock absorber is able to produce a damping force which counteracts the vibration which would otherwise be transmitted from the suspension to the body. The greater the degree to which the flow of damping fluid within the working chamber is restricted by the piston, the greater the damping forces which are generated by the shock absorber.

Shock absorbers typically have a seal disposed between the upper end cap of the shock absorber and the piston rod. The seal is used to prevent damping fluid in the working chamber from leaking to the outside of the shock absorber when the piston rod is displaced. Such seals typically have a plurality of annular lips which engage the piston rod to prevent damping fluid from flowing therebetween. Because the piston rod carries damping fluid from the working chamber to the seal upon sufficient displacement of the piston rod, the seal would often become lubricated after the automobile to which it was attached encountered a sufficiently rough surface.

While such seals were effective in preventing leakage of damping fluid from the working chamber to the outside of the shock absorber, the seals often had several disadvantages. After the shock absorber was stationary for a period of time, the damping fluid which coated the piston rod during movement would often drain into the reservoir of damping fluid in the working chamber leaving the piston rod uncoated. When the piston rod was then initially moved from its stationary position, a relatively large force was required to overcome the friction between the seal and the uncoated piston rod. In addition, the shock absorber would often produce a relatively loud noise or "grunt" when the piston rod was initially displaced after being held stationary for a period of time. This noise or "grunt" was also due to the relatively large frictional forces between the uncoated piston rod and the seal.

SUMMARY OF THE INVENTION

Accordingly, it is the primary object of the present invention to provide a method and apparatus for sealing a movable member with respect to a fixed member in which the force required to initially move the movable member after being held stationary for a period of time is reduced. A related object of the present invention is to provide a method and apparatus for sealing a movable member with respect to a fixed member in which the noise or "grunt" associated with initial movement of the movable member after being held stationary for a period of time is reduced.

Another object of the present invention is to provide a method and apparatus for sealing a movable member with respect to a fixed member in which a portion of the seal remains lubricated after the movable member has been held stationary for a period of time.

A further object of the present invention is to provide a method and apparatus for sealing a movable member with respect to a fixed member in which a portion of the lubricating fluid delivered to the seal upon movement of the movable member is held within the seal by capillary action.

BRIEF DESCRIPTION OF THE DRAWINGS

Various advantages of the present invention will become apparent to one skilled in the art upon reading the following specification and by reference to the following drawings in which.

DESCRIPTION OF THE PREFERRED EMBODIMENTS

Figure 1:
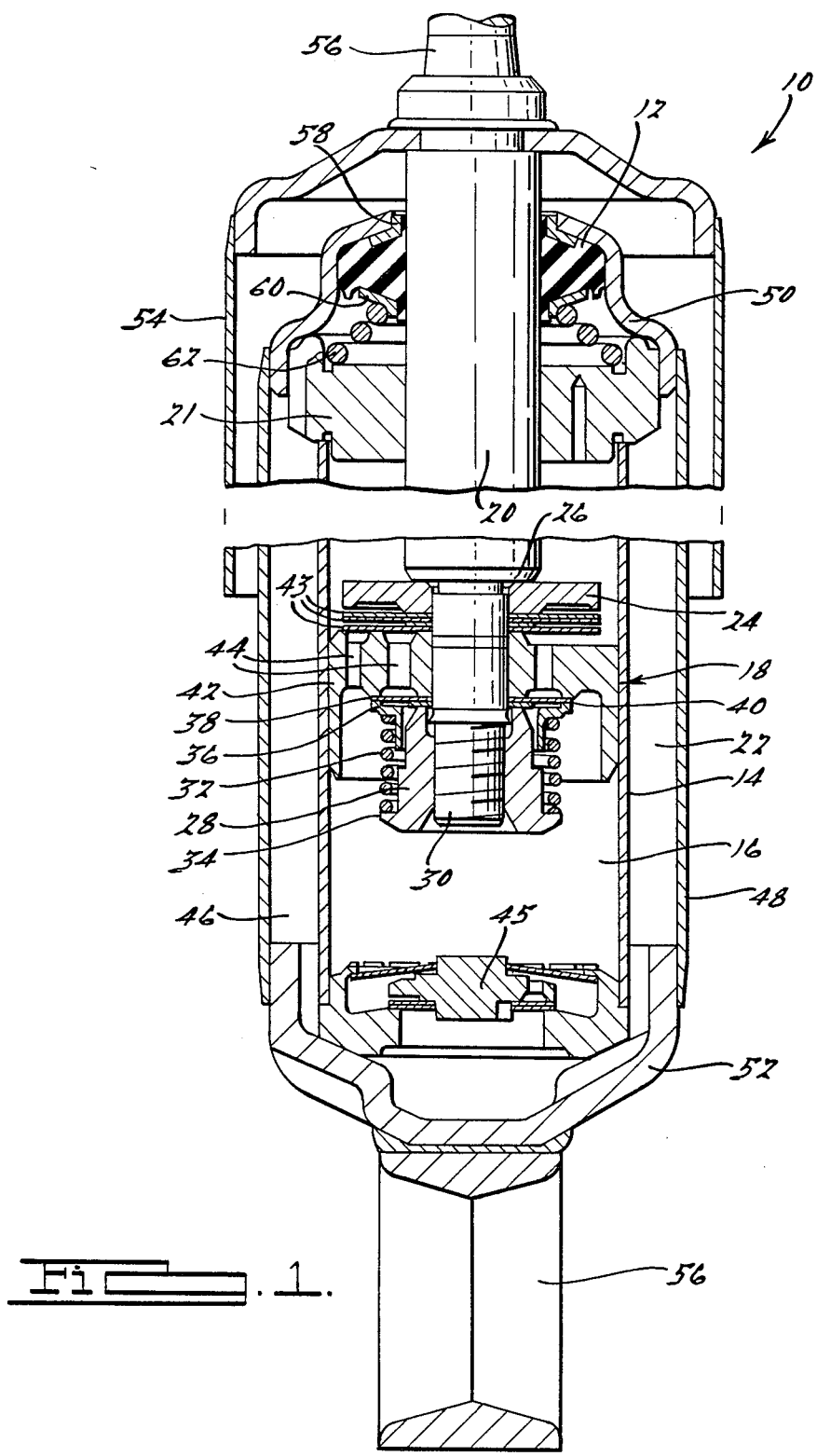
FIG. 1 is a reduced side elevational view partially broken away of a shock absorber using a method and apparatus for sealing according to the first preferred embodiment of the present invention.

Referring to FIG. 1, the shock absorber 10 using a seal 12 according to the preferred embodiments of the present invention is shown. The shock absorber 10 comprises an elongated tubular pressure cylinder 14 defining a damping fluid containing working chamber 16. Disposed within the working chamber 16 is a reciprocable piston 18 that is secured to one end of an axially extending piston rod 20. The upper portion of the piston rod 20 is laterally supported by an annular rod guide 21 which is disposed on the upper portion of the pressure cylinder 14.

Upward movement of the piston 18 with respect to the piston rod 20 is limited by an annular spacer 24 which is disposed between the piston 18 and a radially extending step portion 26 of the piston rod 20. Downward movement of the piston 18 with respect to the piston rod 20 is limited by a threaded nut 28 or similar type fastening element which is threadably received upon the lower portion 30 of the piston rod 20. A helical coil spring 32 is arranged concentrically of the nut 28 and is supported at the lower end thereof by a radially outwardly extending flange 34 on the lower end of the nut 28. The upper end of the spring 32 bears against a spring retainer 36 which in turn acts against the underside of the lower valve disks 38 to thereby resiliently urge the valve disk 38 into sealing engagement with valve seats 40 in the piston housing 42. In addition, a plurality of upper valve disks 43 are provided between the piston housing 42 and the annular spacer 24. The upper valve disks 43 and the lower valve disks 38 are used to control the flow of damping fluid through a plurality of flow passages 44. A further explanation of the construction and operation of the piston 18 is disclosed in U.S. Pat. No. 4,113,072, which is hereby incorporated by reference.

Those skilled in the art will appreciate that, upon reciprocal movement of the piston 18, damping fluid within the working chamber 16 is transferred between the upper and lower portions of the working chamber 16, and between the working chamber 16 and the fluid reservoir 22. By controlling the flow of damping fluid between the upper and lower portion of the working chamber 16, the shock absorber 10 is able to controllably dampen relative movement between the body and the suspension of the automobile to which it is attached so as to optimize both ride and comfort and road handling ability.

A base valve, generally designated by the numeral 45, is located within the lower end of the working chamber 16 and is used to control the flow of damping fluid between the working chamber 16 and an annular fluid reservoir 46. The annular fluid reservoir 46 is defined as the space between the outer periphery of the cylinder 14 and the inner periphery of a reservoir tube or cylinder 48 which is arranged centrally around the exterior of the pressure cylinder 14. The construction and operation of the base valve 45 may be of the type shown and described in U.S. Pat. No. 3,771,626, which is hereby incorporated by reference.

The upper and lower ends of the shock absorber 10 are provided with generally cup-shaped upper and lower end caps 50 and 52 respectively. The end caps 50 and 52 are secured to opposing ends of the reservoir tube 48 by a suitable means such as welding. Accordingly, the housing for the shock absorber 10 comprises the end caps 50 and 52 as well as the reservoir tube 48. The shock absorber 10 is shown as being provided with a dirt shield 54 which is secured at its upper end to the upper end of the piston rod 20. Suitable end fittings 56 are secured to the upper end of the piston rod 20 and the lower end cap 52 for operatively securing the shock absorber 10 between the body and the axle assembly of the automobile.

The annular seal 12 is disposed between the piston rod 20 and the end cap 50. The upper surface of the annular seal 12 is separated from the end cap 50 by an annular anti-extrusion ring 58. The anti-extrusion ring 58 is able to prevent the seal 12 from extruding between the space separating the piston rod 20 and the end cap 50. Further, downward movement of the seal 12 is prevented by an annular retainer seal 60 which is upwardly biased by an oil seal spring 62 which is disposed on the upper surface of the rod guide 21.

Figure 2:
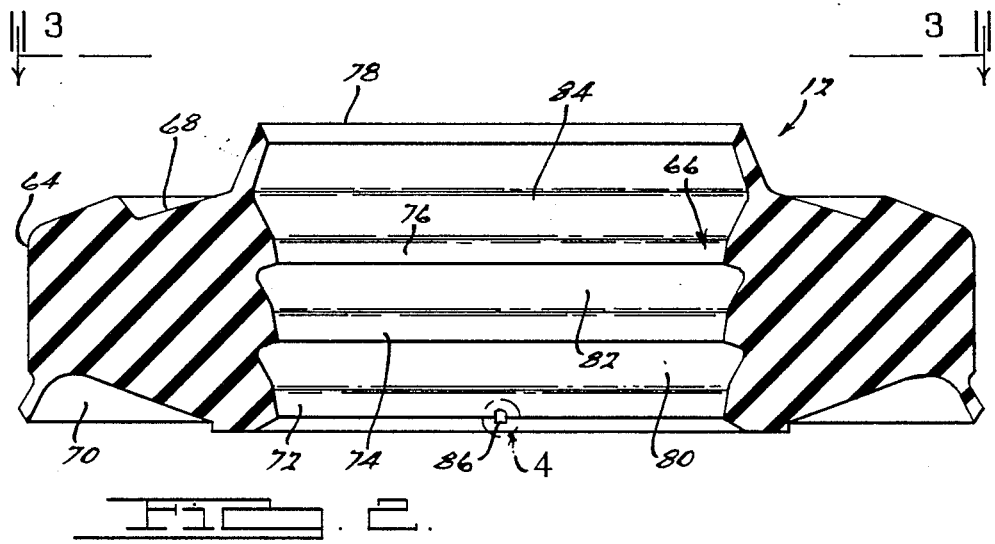
FIG. 2 is an enlarged cross-sectional view of the seal shown in FIG. 1 according to the first preferred embodiment of the present invention.
Figure 3:
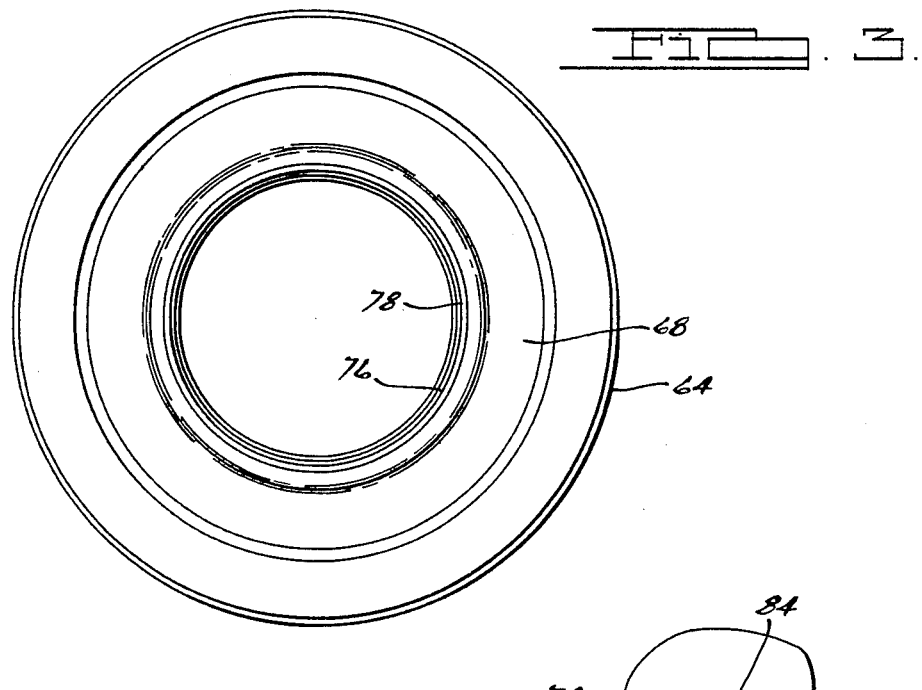
FIG. 3 is an enlarged top view of the seal shown in FIG. 2 taken along line 3—3 according to the first preferred embodiment of the present invention.

As shown in FIG. 2, the seal 12 comprises first and second surfaces 64 and 66. The first surface 64 is disposed adjacent to the end cap 50 and is operable to prevent the flow of damping fluid between the end cap 50 and the first surface 64 of the seal 12. The second surface of the seal 12 is disposed adjacent to the piston rod 20 and is operable to prevent the flow of damping fluid between the piston rod 20 and the second surface 66 of the seal 12. The seal 12 further comprises an upper annular indented region 68 and a lower annular indented region 70. The upper annular indented region 68 is used to receive the anti-extrusion ring 58 so as to prevent upward movement of the seal 12 during operation. The lower annular indented region 70 is used to receive the retainer seal 60 to prevent downward movement of the seal 12. While the seal 12 may be made from low nitrile buna-n, other suitable materials may be used.

The seal 12 further comprises a plurality of annular lips 72-78 separated by a plurality of annular recesses 80-84. The annular lip 72 is disposed closest to the damping fluid in the working chamber 16 and is separated from the annular lip 74 by the annular recess 80. Similarly, the annular lip 74 is located closer to the damping fluid in the working chamber 16 than the annular lip 76, and is separated from the annular lip 76 by the annular recess 82. In addition, the annular lip 76 is located closer to the damping fluid in the working chamber 16 than the annular lip 78, and is separated from the annular lip 78 by the annular recess 84. The annular lips 72 and 78 serve not only to limit the flow of damping fluid leaking from the shock absorber 10, but also act as dirt barriers to prevent dirt from the environment from entering the working chamber 16 of the shock absorber 10.

To provide means for lubricating the seal 12, a plurality of grooves 86 are provided. The grooves 86 extend axially with respect to the piston rod 20, and are disposed on the annular lip 72 adjacent to the piston rod 20. The grooves 86 are radially displaced by approximately 90°, though it is to be understood that other suitable radial distances may be used. The cross-section of the grooves 86 are semicircular in shape, and have a radius selected to maximize the amount of damping fluid which is stored in the annular recess 80 by means of capillary action in the manner described below. While the optimum radius of the grooves 86 are selected empirically, an approximation of the radius can be obtained using the following formula:

$$r = \frac{2y}{hpg}$$

where:
r is the radius of the grooves;
y is the surface tension of the damping fluid;
p is the density of the damping fluid;
g is the acceleration of gravity; and
h is the vertical length of the grooves.

Figure 4:
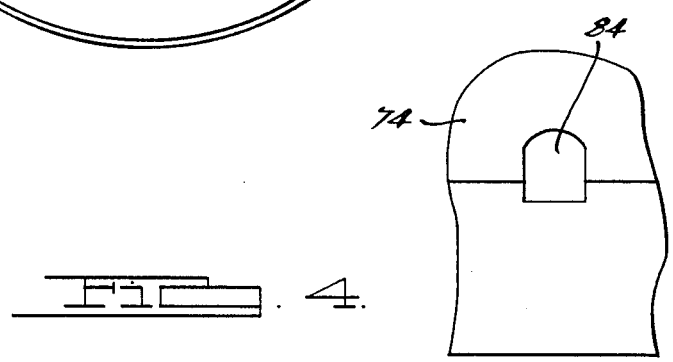
FIG. 4 is an enlarged view of the groove of the seal shown in the circled portion 4 of FIG. 2 according to the first preferred embodiment of the present invention.

In the seal shown in FIG. 4, the radius of the grooves may typically be 0.005–0.008 inches.

By placing the grooves 86 in the annular lip 72 of the seal 12, damping fluid drawn upward along the surface of the piston rod 20 into the annular recess 80 through the grooves 86 during movement of the piston rod 20 is held in the annular recess 80 by capillary action. Because the grooves 86 permit damping fluid entering the annular recess 80 to be retained by capillary action within the annular recess 80 after movement of the piston rod ceases, the annular lips 72–78 become lubricated with a relatively small movement of the piston rod 20 after movement of the piston rod 20 begins. This is in contrast with seals which do not have the grooves 86 according to the present invention, in which damping fluid was delivered to the annular lips 72–78 only after the automobile to which the shock absorber 10 was attached encountered a sufficiently rough surface so that the portion of the piston rod 20 disposed within the damping of the working chamber 16 passed over the seal.

Figure 5:
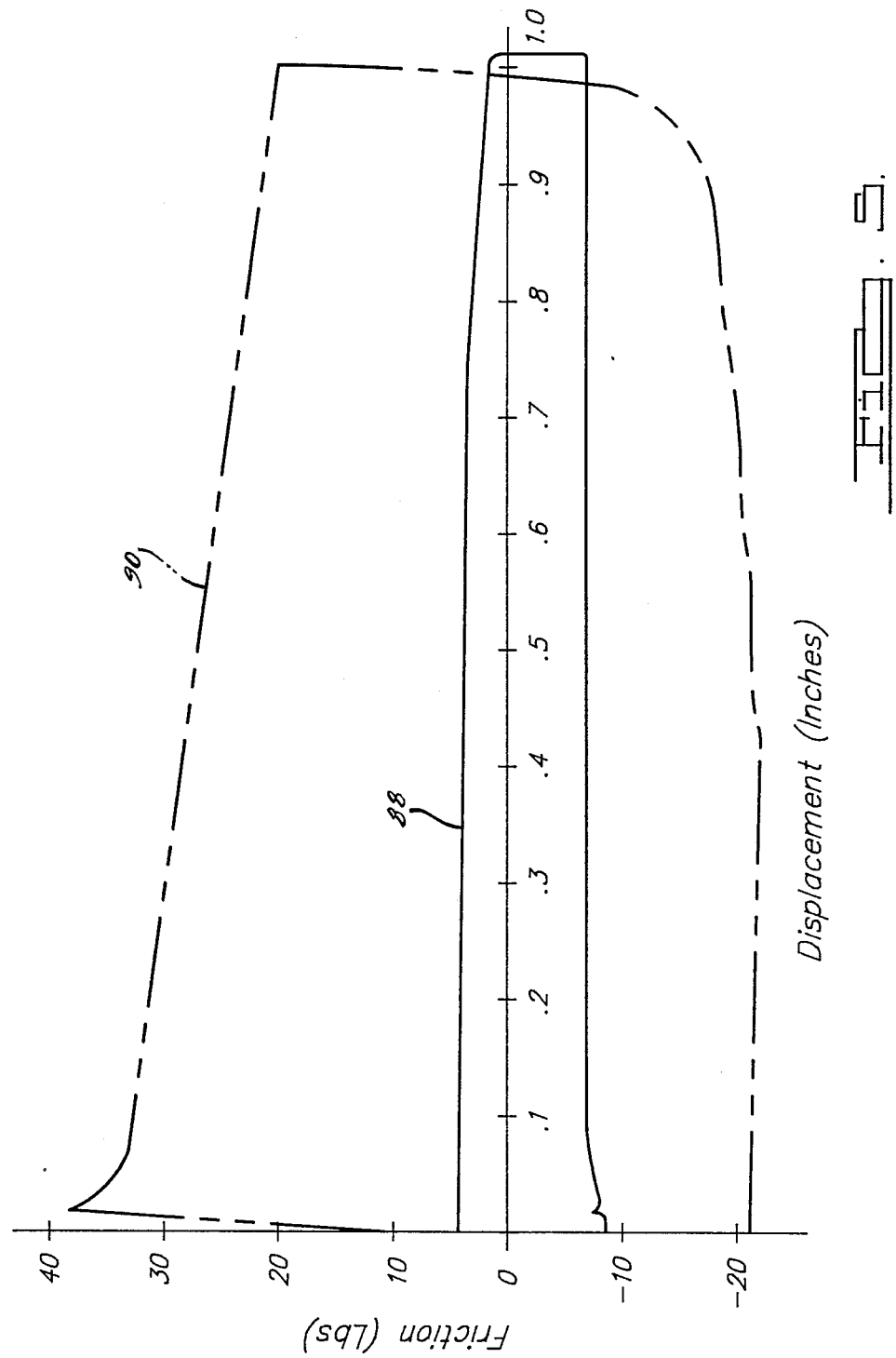
FIG. 5 is a graph reflecting the frictional forces associated with a seal according to the first preferred embodiment of the present invention.

A representative comparison of the resulting force required to move the piston rod 20 with and without the lubrication provided by the grooves 86 is shown in FIG. 5. The solid line 88 represents the force which is associated with moving the piston rod 20 when the annular lip 72 has four grooves disposed according to the preferred embodiment of the present invention. In contrast, the dotted line 90 represents the force associated with moving the piston rod 20 when there is an absence of grooves on the annular lip 72. As shown, movement of the piston rod 20 using a seal according to the preferred embodiment of the present invention requires somewhat less than ten pounds before movement of the piston rod 20 is permitted. This is in contrast to the seals which do not have the grooves according to the preferred embodiment of the present invention, in which movement of the piston rod is achieved only after a force of 40 pounds was applied to the piston rod. It will be appreciated, however, that the absolute force required to move the piston rod 20 with and without the grooves 86 is dependent upon a number of factors.

Figure 6:
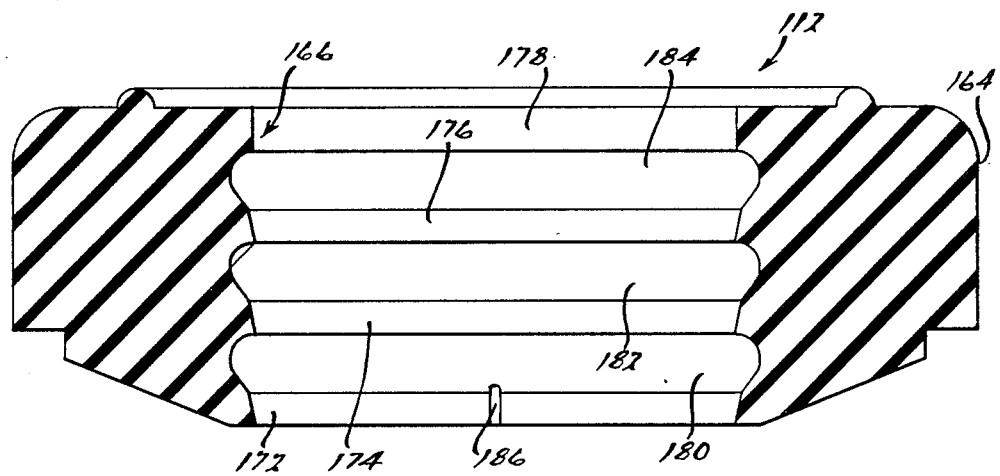
FIGS. 6 and 7 are enlarged cross-sectional views of the seal shown in FIG. 1 according to the second and third embodiments of the present invention.
Figure 7:

While it will be apparent that the preferred embodiment illustrated above is well calculated objects, it will be appreciated that the present invention is susceptible to modification, variation and change without departing from the scope of the invention. For example, second and third preferred embodiments of the present invention are shown in FIGS. 6 and 7, where the elements 112, 164, 166, 172–186 of FIG. 6 correspond to the elements 12, 64, 66, 72–86 of FIG. 2, and the elements 212, 264, 266, 272–276, 280, 282 and 286 of FIG. 7 correspond to the elements 12, 64, 66, 72–76, 280, 282 and 286 of FIG. 2. While the present invention was described in conjunction with a shock absorber, it also may be used with struts or other suitable damping devices. Further, the seal may be used in different applications, and may have either a greater or fewer number of grooves. In addition, the shape of the grooves may be different and a larger or smaller number of annular lips may be used. Accordingly, the scope of the invention is to be measured against the scope of the following claims.

What is claimed is:

1. A single piece seal for a shock absorber having a shock absorber housing and a piston rod partially disposed within the damping fluid in the working chamber of said shock absorber, said seal comprising:
   first surface engaging said shock absorber housing operable to prevent the flow of damping fluid between said first surface and said shock absorber housing;
   second surface engaging said piston rod, said second surface operable to prevent the flow of damping fluid between said second surface and said piston rod, said second surface comprising:
   (a) a first annular lip coaxially disposed on said second surface with respect to said piston rod, said first annular lip engaging said piston rod and being operable to wipe damping fluid deposited on said piston rod;
   (b) a second annular lip coaxially disposed on said second surface with respect to said piston rod, said first and second annular lips forming a first annular recess therebetween; and
   (c) means for lubricating said first annular lip comprising a plurality of spaced grooves axially disposed on said first annular lip adjacent to the piston rod, said grooves having a semicircular shape cross-section with a radius approximately equal to:

$$r = \frac{2y}{hpg}$$

where:
   r is the radius of said grooves;
   y is the surface tension of the fluid;
   p is the density of the fluid;
   g is the acceleration of gravity; and
   h is the vertical height of said grooves,
said means for lubricating operable to allow damping fluid to flow into said first annular recess when damping fluid is delivered to said grooves by movement of said piston rod, said means for lubricating operable to allow damping fluid in said first annular recess to be retained in said first annular recess by capillary action.

2. The seal of claim 1, wherein said second annular lip is disposed further from the damping fluid in said working chamber than said first annular lip.

3. The seal of claim 1, wherein said grooves are equally spaced around the periphery of said first annular lip.

4. The seal of claim 1, wherein said seal comprises four grooves disposed on said first annular lip.

5. A single piece seal for preventing the flow of fluid between first and second members, said second member being partially disposed within a source of fluid and being displaceable with respect to said first member, said seal comprising:
   a first surface engaging said first member, said first surface operable to prevent the flow of fluid between said first surface and said first member;
   a second surface engaging said second member, said second surface operable to prevent the flow of fluid between said second surface and said second member, said second surface comprising:
   (a) a first lip member disposed on said second surface, said first lip member engaging said second member and being operable to wipe fluid deposited on said second member;
   (b) a second lip member disposed on said second surface, and first and second lip members forming a first recess therebetween; and
   (c) means for lubricating said first lip member comprising a plurality of spaced grooves axially disposed on said first lip member adjacent to said second member, said grooves having a semicircular shape cross-section with a radius approximately equal to:

$$r = \frac{2y}{hpg}$$

where:
   r is the radius of said grooves;
   y is the surface tension of the fluid;
   p is the density of the fluid;
   g is the acceleration of gravity; and
   h is the vertical height of said grooves,
said means for lubricating operable to allow said fluid to flow into said first recess when said fluid is delivered to said grooves by movement of said second member, said means for lubricating operable to allow said fluid in said first recess to be retained in said first recess by capillary action.

6. The apparatus of claim 5, wherein said second lip is disposed further from said source of fluid than said first lip member.

7. The apparatus of claim 5, wherein said grooves are equally spaced around the periphery of said first lip member.

8. The apparatus of claim 5, wherein said seal comprises four grooves disposed on said first lip member.

9. A method for reducing the frictional force between a movable member and a single piece seal secured to a fixed member, said movable member operable to be partially disposed in a reservoir of lubricating fluid, said method comprising the steps of:
 disposing said single piece seal substantially between said fixed member and said movable member comprising the steps of:
 disposing a first surface of said single piece seal adjacent to said fixed member so as to prevent the flow of fluid between said first surface and said fixed member, and
 disposing a second surface of said single piece seal adjacent to said movable member, said second surface operable to prevent the flow of fluid between said second surface and said movable member, said second surface comprising:
  (a) a first annular lip coaxially disposed on said second surface with respect to said movable member, said first annular lip engaging said movable member and being operable to wipe fluid deposited on said movable member;
  (b) a second annular lip coaxially disposed on said second surface with respect to said movable member, said first and second annular lips forming a first annular recess therebetween; and
  (c) means for lubricating said first annular lip comprising a plurality of spaced grooves axially disposed on said first annular lip adjacent to said movable member and having a semicircular shape cross-section with a radius approximately equal to:

$$r = \frac{2y}{hpg}$$

where:
 r is the radius of said grooves;
 y is the surface tension of the fluid;
 p is the density of the fluid;
 g is the acceleration of gravity; and
 h is the vertical height of said grooves,
 said means for lubricating operable to allow fluid to flow into said first annular recess when damping fluid is delivered to said grooves by movement of said movable member, said means for lubricating operable to allow damping fluid in said first annular recess to be retained in said first annular recess by capillary action;
disposing a portion of said movable member in said reservoir of lubricating fluid;
causing lubricating fluid to be delivered to a recess within said seal during displacement of said movable member through said plurality of spaced grooves in said first annular lip; and
retaining lubricating fluid in said recess by capillary action after displacement of said movable member has terminated.

10. The method of claim 9, wherein said grooves are equally spaced around the periphery of said first lip.

11. The method of claim 9, wherein said step of causing lubricating fluid to be delivered to a recess comprises the step of delivering damping to said recess through four grooves disposed on said first lip.

* * * * *